(12) United States Patent
Nomura et al.

(10) Patent No.: US 6,687,556 B2
(45) Date of Patent: Feb. 3, 2004

(54) METHOD OF AND APPARATUS FOR THIN PLATE ASSEMBLY, AND COMPUTER PRODUCT

(75) Inventors: Michinao Nomura, Kawasaki (JP); Yoshiaki Yanagida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 299 days.

(21) Appl. No.: 09/956,943

(22) Filed: Sep. 21, 2001

(65) Prior Publication Data

US 2002/0198620 A1 Dec. 26, 2002

(30) Foreign Application Priority Data

Jun. 20, 2001 (JP) .......................................... 2001-187069

(51) Int. Cl.$^7$ ............................................... G06F 19/00
(52) U.S. Cl. .......................... 700/95; 700/117; 29/450; 29/468
(58) Field of Search .................... 700/95, 117; 29/450, 29/468; 362/31

(56) References Cited

U.S. PATENT DOCUMENTS

| | | | | |
|---|---|---|---|---|
| 4,630,344 A | * | 12/1986 | Boyle et al. | 29/898.054 |
| 4,810,018 A | * | 3/1989 | van de Ven et al. | 294/88 |
| RE34,978 E | * | 6/1995 | Adams et al. | 29/468 |
| 5,953,804 A | * | 9/1999 | Dragotta | 29/407.1 |
| 6,049,960 A | * | 4/2000 | Pilling et al. | 29/450 |
| 6,162,383 A | * | 12/2000 | Hane et al. | 264/221 |
| 6,536,932 B1 | * | 3/2003 | Suzuki et al. | 362/560 |

* cited by examiner

Primary Examiner—Leo Picard
Assistant Examiner—Zoila Cabrera
(74) Attorney, Agent, or Firm—Westerman, Hattori, Daniels & Adrian, LLP

(57) ABSTRACT

A blade as an edged member having separated two forward ends is inserted into an opening of a holder as a U-shaped member, and a gap between the two forward ends of the inserted blade is widened so that a width of the opening is expanded, and a light guide body as a thin plate is inserted into the opening with expanded width, and after that the two forward ends of the blade are drawn from the opening.

17 Claims, 12 Drawing Sheets

METHOD OF AND APPARATUS FOR THIN PLATE ASSEMBLY, AND COMPUTER PRODUCT

FIELD OF THE INVENTION

This invention relates to technology for assembling a thin plate assembly product to be used in a front light unit and the like of a portable telephone.

BACKGROUND OF THE INVENTION

FIG. 1 is an explanatory diagram showing a structure of a general front light unit. A front light unit 1 of a portable telephone or the like is, as shown in FIG. 1, constituted so that a light guide body 4 and a light guide pipe 5 are manually inserted into a holder 3 to which FPC (Flexible Printed Circuit) 2 with LED (Light Emitting Diode) not shown, is mounted (for example, see FIG. 2).

The holder 3 has a U shape, and the FPC 2 with LED is adhered to an upper surface of the holder 3. The LED is positioned in both ends of the holder 3. The light guide body 4 has a sawtooth-shaped surface which is called as a prism surface on its one side, and its surface range becomes an effective light emitting area. A thickness of the light guide body 4 is slightly thicker than an opening of the U-shaped portion of the holder 3, and a width of the light guide body 4 is shorter than a width of the holder 3. The light guide pipe 5 has a plate shape, and its thickness is slightly thicker than the opening of the holder 3, and its width is shorter than the holder 3 and slightly longer than the light guide body 4.

When the light guide body 4 and the light guide pipe 5 are inserted, firstly in order to remove dust of insertion portions, an air is allowed to sufficiently blow onto the holder 3 by air blow. As shown in FIG. 2, the FPC 2 with LED is adhered to the holder 3. The light guide pipe 5 is manually inserted into the opening of the holder 3. Next, as shown in FIG. 3, the holder 3 into which the light guide pipe 5 has been already inserted is installed on an assembly jig 6, and the light guide body 4 is inserted into the opening of the holder 3 until it butts against the light guide pipe 5 (arrow a in FIG. 4).

After insertion, in order to adjust the holder 3 and the light guide body 4 into a predetermined positional relationship in a width wise direction, the light guide body 4 is slid to a butting portion of the assembly jig 6 (arrow b in FIG. 4). Since the thickness of the light guide body 4 is slightly thicker than the opening of the holder 3, the light guide body 4 and the light guide pipe 5 are fixed to the holder 3. The assembly product is removed from the assembly jig 6 (see FIG. 5), and dust is removed from the surface by air blow. Next, in order to conduct detection of scratch and dust on the surface of the light guide body 4 of the assembly product and the light emitting test of LED, a clip for checking light emission of LED is attached to a terminal portion of the FPC 2 attached to the holder 3 so that a light is emitted from the LED. The surface of the light guide body 4 is visually checked for scratch and dust so that the check is ended.

However, according to the conventional assembly method, since the thicknesses of the light guide body 4 and the light guide pipe 5 are thicker than the opening of the holder 3, when the light guide body 4 and the light guide pipe 5 are manually inserted into the holder 3, they rub so as to damage the prism surface of the light guide body 4 or the surface of the light guide pipe 5. As a result, an amount of a light converged on the prism surface is lowered, and uniform light emission cannot be obtained. Namely, the ability of the product is possibly lowered.

In addition, since the manual operation is normally performed, the fixing force of the light guide body 4 and the light guide pipe 5 to the holder 3 is not constant, and the light guide body 4 is shifted after assembly. Namely, there arises a problem that a stable quality cannot be obtained. Further, since a series of the operations from the assembly to the check is manually performed, there arise problems that dust or scratch are generated and productivity is not good.

SUMMARY OF THE INVENTION

It is an object of the present invention to provide a method of and apparatus for thin plate assembly, and a computer product which are capable of assembling a thin plate assembly product such as a light guide body efficiently and securely without damaging the thin plate.

According to the present invention, an edged member (blade) having separated two forward ends is inserted into an opening of a U-shaped member (holder), and a gap between the two forward ends of the inserted edged member is widened so that a width of the opening is expanded, and a thin plate is inserted into the opening with expanded width, and after that the edged member is drawn from the opening.

Thus, even if the thin plate is inserted into the opening of the U-shaped member, a width thereof is narrower than the thickness of the thin plate, the insertion and assembly can be carried out smoothly without damaging the thin plate, and a number of handling times is reduced and the quality of products can be improved.

In addition, in a state that the edged member is drawn from the opening, light emission of LED attached to the U-shaped member may be checked. Moreover, in the state that the edged member is drawn from the opening, static electricity charged on the U-shaped member and the thin plate may be destaticized. Moreover, in the state that the edged member is drawn from the opening, a fixing force between the U-shaped member and the thin plate may be measured.

In addition, the U-shaped member is moved to a direction where it reaches the edged member so that the edged member may be inserted into the opening. As a result, when the edged member is inserted, it is not necessary to move the edged member itself. Moreover, the opening may be expanded so that its width becomes wider than the thickness of the thin plate. As a result, when the thin plate is inserted into the opening, the thin plate does not come into contact with the opening.

Other objects and features of this invention will become apparent from the following description with reference to the accompanying drawings.

DESCRIPTION OF THE PREFERRED EMBODIMENTS

Embodiment of the method of and apparatus for thin plate assembly, and the computer product of the present invention will be explained below with reference to the accompanying drawings.

Figure 1:
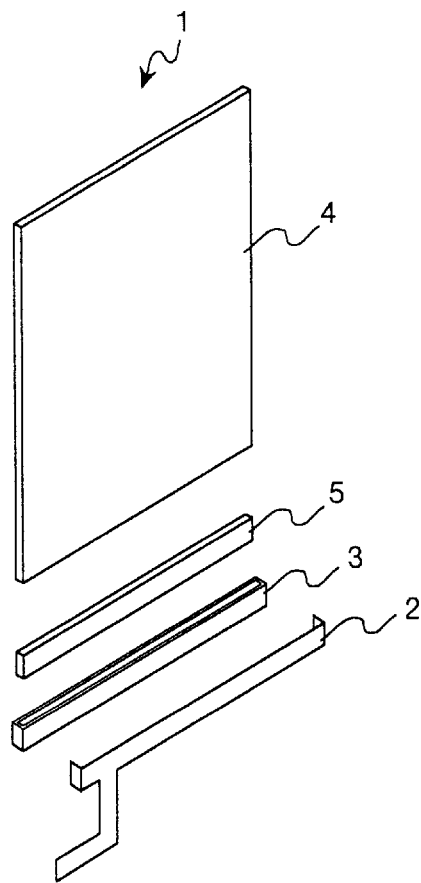
FIG. 1 is an explanatory diagram showing a structure of a general front light unit.
Figure 2:
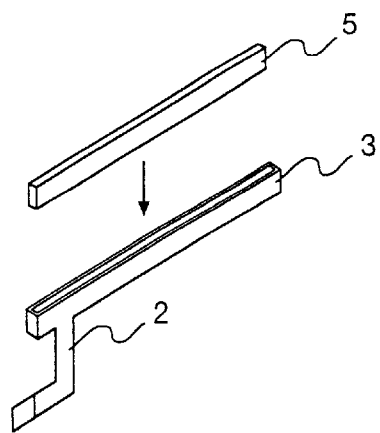
FIG. 2 is an explanatory diagram showing a procedure of assembling a conventional front light unit.
Figure 3:
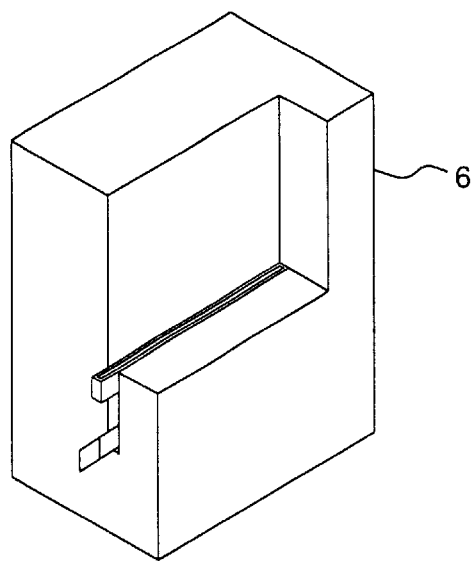
FIG. 3 is another explanatory diagram showing a procedure of assembling the conventional front light unit.
Figure 4:
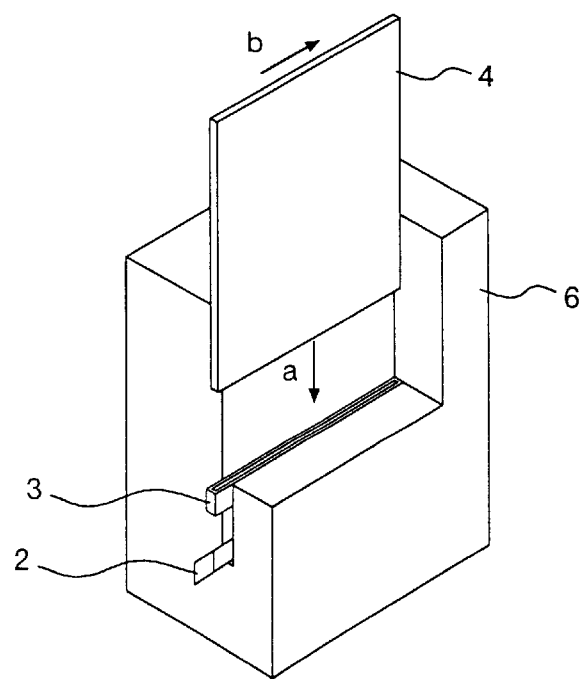
FIG. 4 is another explanatory diagram showing a procedure of assembling the conventional front light unit.
Figure 5:
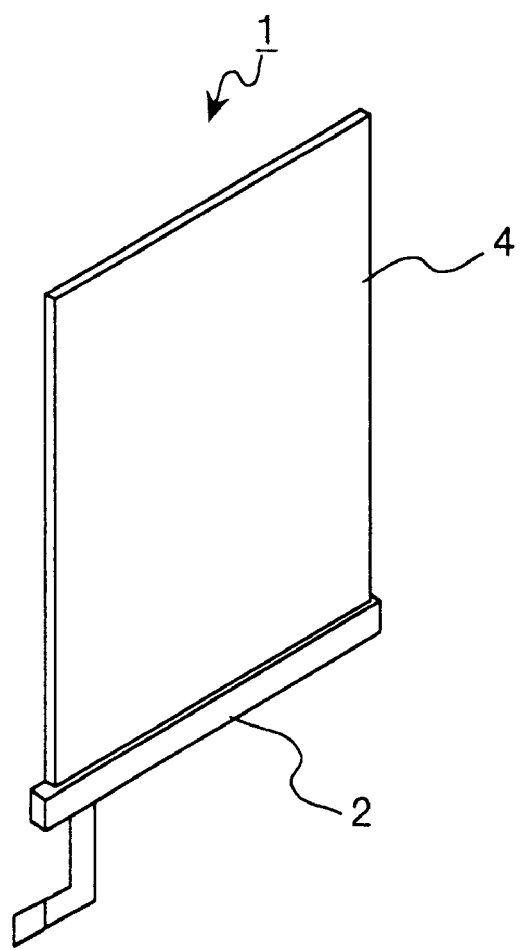
FIG. 5 is an overall view of the general front light unit.
Figure 6:
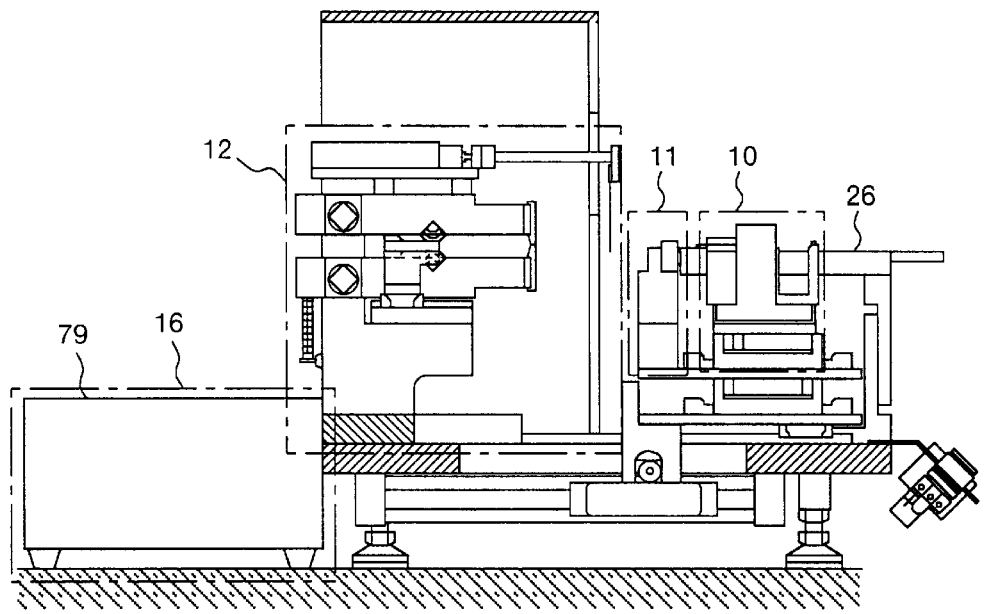
FIG. 6 is a side view of a thin plate assembly apparatus according to an embodiment of the present invention.
Figure 7:
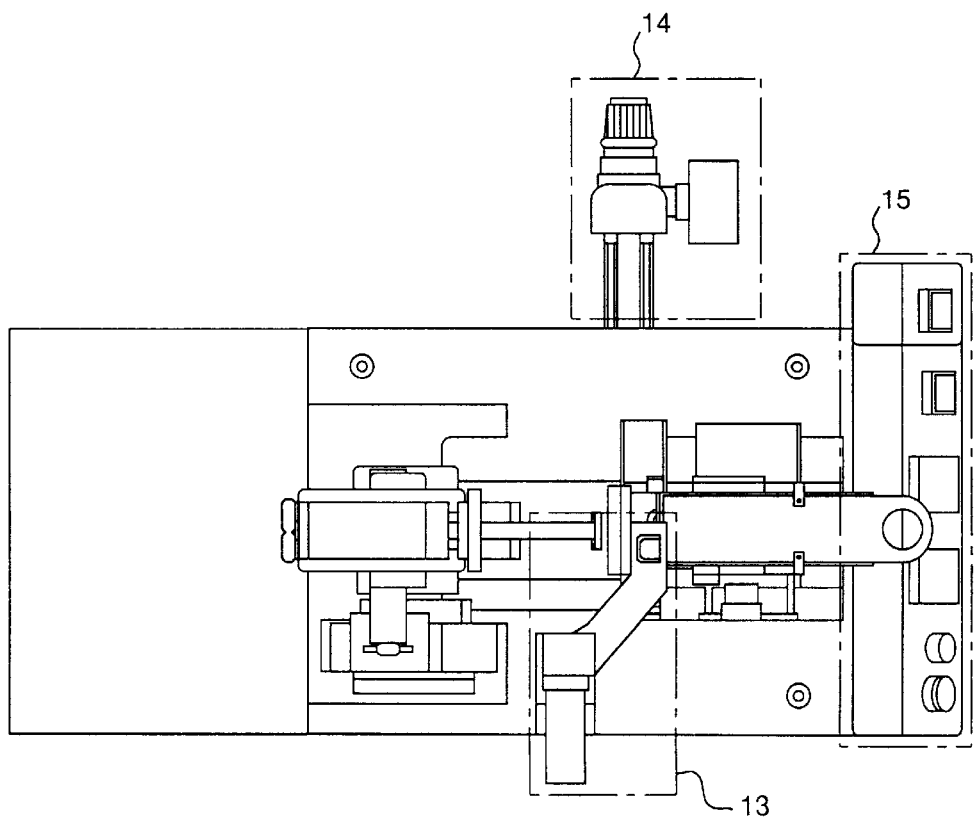
FIG. 7 is an upper view of the thin plate assembly apparatus according to the embodiment of the present invention.
Figure 8:
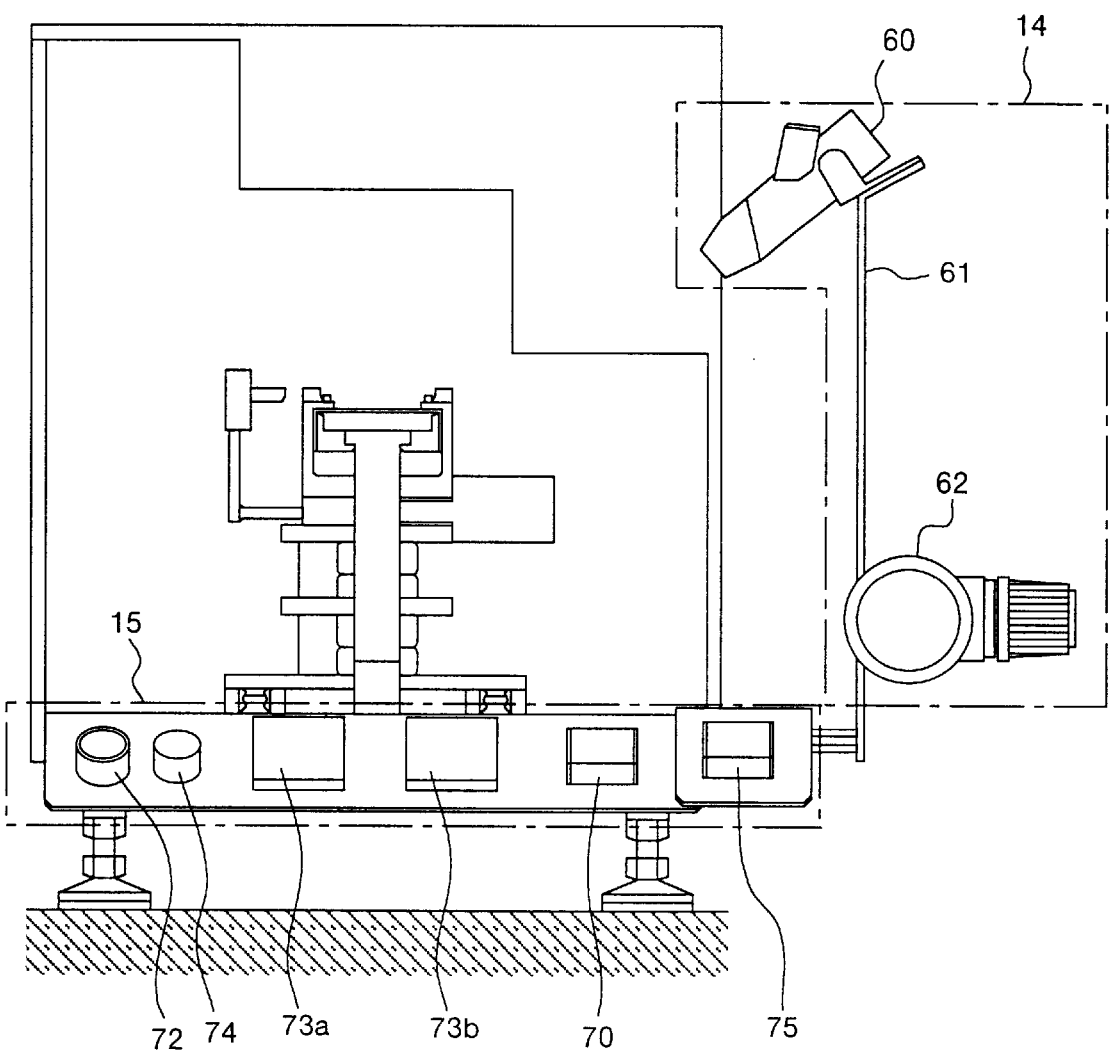
FIG. 8 is a front view of the thin plate assembly apparatus.
Figure 9:
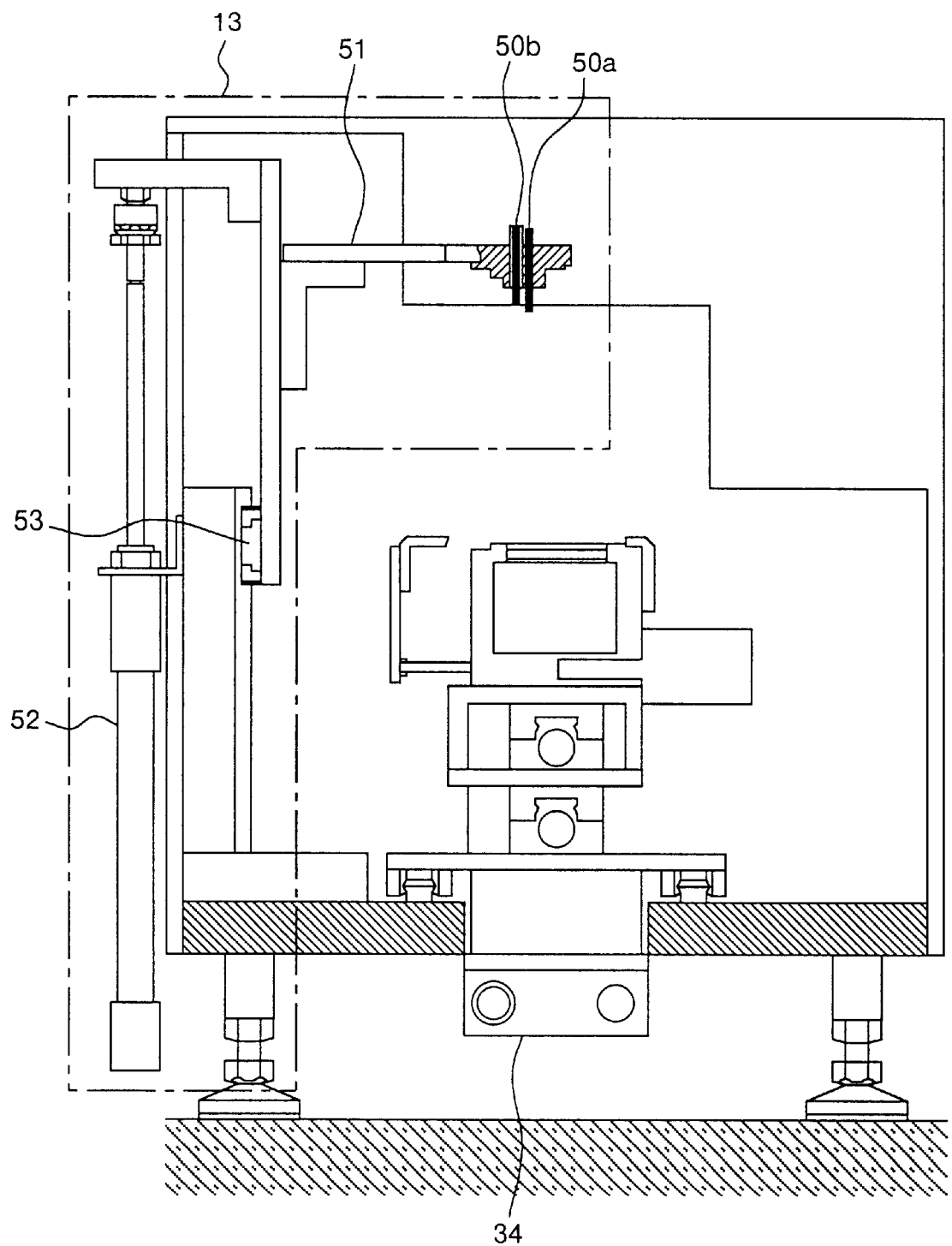
FIG. 9 is a cross section of the thin plate assembly apparatus.

To begin with, an outline of the thin plate assembly apparatus according to the present invention will be explained. FIG. 6 is a side view of the thin plate assembling apparatus according to an embodiment of the present invention. FIG. 7 is an upper view, FIG. 8 is a front view, and FIG. 9 is a cross section of the thin plate assembly apparatus.

The thin plate assembly apparatus is composed of the following six parts:

(1) a stage assembly 10 on which a light guide body 4 is set;
(2) a holder stage assembly 11 on which a holder 3 is set;
(3) a blade unit 12 for expanding an opening of the holder 3 by a prescribed amount;
(4) a probe unit 13 for bringing a probe into contact with a terminal on FPC 2 of the holder 3 and allowing a light to be emitted from LED;
(5) a destaticization blow assembly 14 for destaticizing static electricity charged on a workpiece; and
(6) a fixing force measuring device 19 for measuring a fixing force of the light guide body 4 and the holder 3 after assembly.

More concretely, the thin plate assembly apparatus shown in FIGS. 6 to 9 is composed of the stage assembly 10, the holder stage assembly 11, the blade unit 12, the probe unit 13, the destaticization blow assembly 14, an operation panel 15, an air equipment housing section 16, a control box, an air stand, not shown, the fixing force measuring device 19, and a receiving block 26 on which a check LCD is set at the time of checking light emission of LED.

Further, it is desirable that a carrier mechanism (not shown) of the holder 3, the light guide body 4 and the light guide pipe 5 is provided in this thin plate assembly apparatus. Moreover, it is desirable that a check mechanism for checking LED is provided. This thin plate assembly apparatus checks the assembly and post-assembly of the holder 3, the light guide body 4 and the light guide pipe 5.

Figure 10:
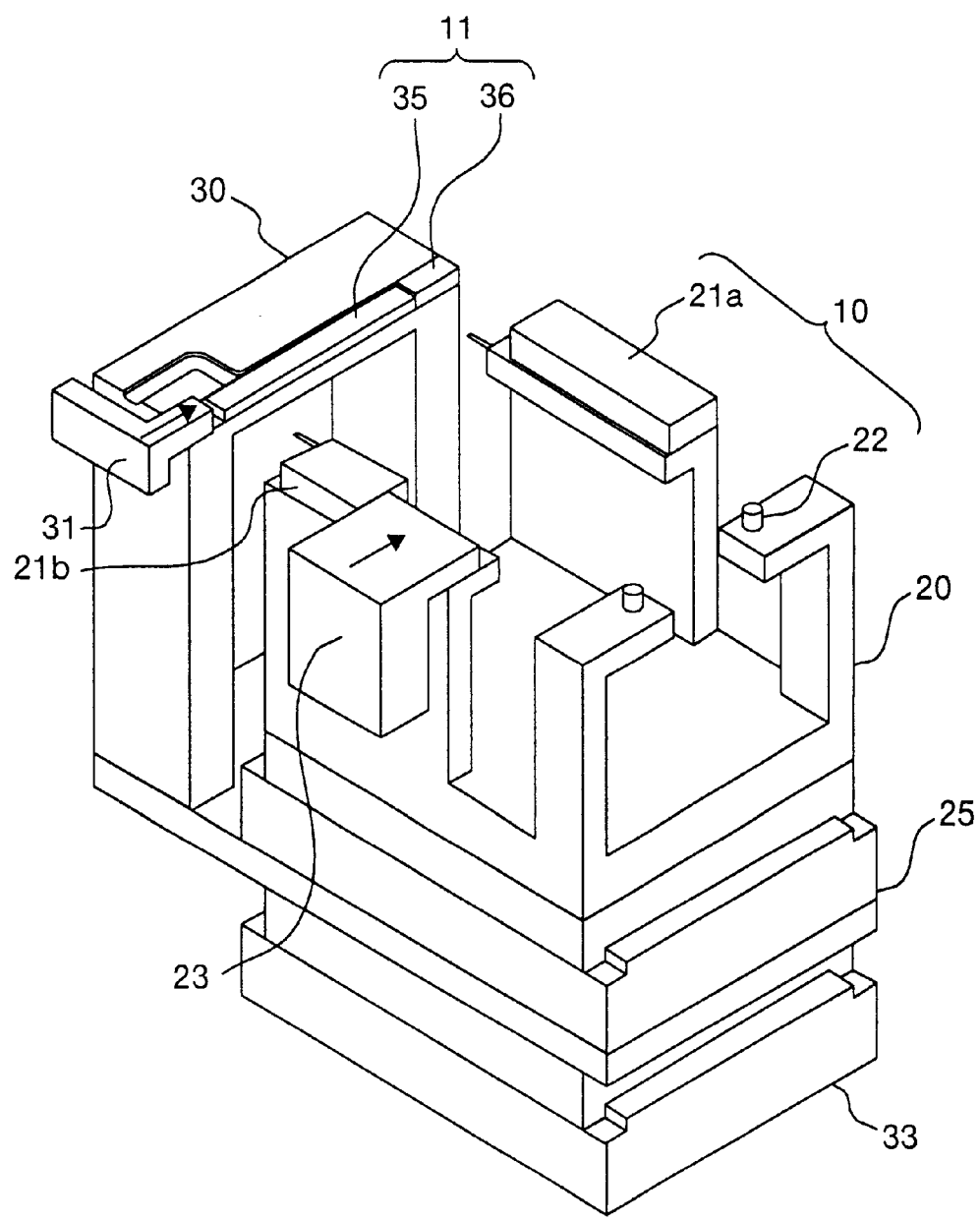
FIG. 10 is an overall view of a stage assembly of the thin plate assembly apparatus and a holder stage assembly according to the embodiment of the present invention.

Now, the structures of the stage assembly and the holder stage assembly will be explained. FIG. 10 is an overall view of the stage assembly and the holder stage assembly of the thin plate assembly apparatus. The stage assembly 10 shown in FIG. 10 is composed of a thin plate set block 20, guide blocks 21a and 21b, a locating pin 22, a thin plate butting block 23, a thin plate butting cylinder, not shown, and a thin plate moving cylinder 25. The light guide body 4 and the light guide pipe 5 are set in the thin plate set block 20. The guide blocks 21a and 21b locate side surfaces of the light guide body 4 and the light guide pipe 5 and serve as guides at the time of inserting them. The locating pin 22 locates a surface opposite to the surface of the light guide body which is inserted into the holder. The thin plate butting block 23 allows the side surface of the set light guide body 4 to but against the guide block 21a. The thin plate butting cylinder actuates the thin plate butting block 23. The thin plate moving cylinder 25 moves the light guide body 4 and the light guide pipe 5 to a vicinity of the holder 3.

The thin plate set block 20 has a U shape that its opening is an upper surface, and supports a portion of the light guide body 4 other than the effective light emitting area. A black conductive plastic is used for a contact surface of the light guide body 4 and the light guide pipe 5 so as to prevent scratch. In order to detect as to whether or not the light guide body 4 and the light guide pipe 5 are set, a plurality of holes are provided on the contact surface of the light guide body 4 and the light guide pipe 5. The light guide body 4 and the light guide pipe 5 are absorbed by a vacuum, not shown so that their existence is confirmed. In the case where workpieces of different dimensions and materials are used, the thin plate set block 20 is changed. In such a manner, the general-purpose mechanism which does not depend on types is introduced so that the cost and a number of steps at the time of improvement in the apparatus due to a change in machine type can be suppressed and a quick measure can be taken.

The guide blocks 21a and 21b are attached to the thin plate set block 20. A length of 21a is longer than a length of 21b (about twice), and they have shapes which are symmetrical with respect to a, longitudinal direction. Portions of the guide blocks 21a and 21b which are opposed to the holder 3 have needle shapes, and their forward ends move to the inside or the vicinity of the holder 3 at the time of insertion, and this makes the insertion of the light guide body 4 and the light guide pipe 5 easy. A plurality of holes for vacuum are provided on a surface of the guide block 21a which contacts with the side surface of the light guide body 4 in order to detect existence/non-existence of the light guide body 4. Moreover, the contact surface of the guide block 21a with the light guide body 4 becomes a reference surface which determines an assembly dimension at the time of inserting the light guide body 4 into the holder. After the operability at the time of setting the light guide body 4 is taken into consideration, the contact surface with the side surface of the light guide body 4 is about ⅔ of the longitudinal direction of the light guide body 4.

The guide blocks 21a and 21b are subject to a quenching process because the needle-shaped portions are easily bent. The locating pin 22 is pressurized into the thin plate set block 20, and locates a surface of the light guide body 4 which is opposite to the holder insertion surface. The thin plate butting block 23 contains a spring so as to prevent an unnecessary load from being applied to the light guide body 4 and prevent the light guide plate 4 from being deflected when the light guide body 4 is dug. Since dust is possibly generated due to contact between the spring and the member, the inside of the block is absorbed and ventilated by a vacuum. After the operability at the time of setting the light guide body 4 is taken into consideration, a dimension of the block which comes in contact with the side of the light guide body 4 is determined to be about half of the longitudinal direction of the light guide body 4.

As for the thin plate butting cylinder (not shown) the thin plate butting block 23 is attached to a forward end of a rod, and before the light guide body 4 butts against it, a gap between the thin plate butting block 23 and the light guide body 4 is about 20 mm so that the operability is taken into consideration. In order to prevent generation of dust from the thin plate butting cylinder, the cylinder which deals with a clean room is used. The thin plate moving cylinder 25 is on a lower surface of the thin plate set block 20, and moves along the thin plate set block 20 forward and backward so as to allow the light guide body 4 and the light guide pipe 5 to approach the holder 3. In order to prevent generation of dust from the thin plate moving cylinder 25, the cylinder which deals with a clean room is used.

In addition, in FIG. 10, the holder stage assembly 11 is composed of a holder set block 30, a holder butting block 31 and a holder butting cylinder (not shown). The holder 3 is set in the holder set block 30 in a state that the FPC 2 is a lower surface. The holder butting block 31 locates the set holder 3 in a predetermined position. The holder butting cylinder operates the holder butting block 31.

The holder set block 30 has a gate shape, and the holder 3 is set on its upper surface. A rubber 35, which absorbs a movement of a set portion of the holder 3 when the opening of the holder 3 moves up and down at the time of expanding the holder 3, is adhered to the surface where the holder 3 is set. In order to detect existence/non-existence of the holder 3, a plurality of holes for vacuum are provided on a surface of the block 30 which comes into contact with the holder 3. Since the holder 3 is set in the state that the FPC 2 surface faces downward so that a terminal for checking LED faces upward, a clearance for the FPC 2 portion is provided. In the case where workpieces of different dimensions and materials are used, the holder set block 30 is changed. In such a manner, the general-purpose mechanism which does not depend on types is introduced so that the cost and a number of steps at the time of improvement in the apparatus due to a change in types can be suppressed. As a result, a quick measure can be taken.

The holder locating block 36 is attached to the holder set block 30, and locates the end surface of the holder 3. The holder locating block 36 and the guide block 21a determine the assembly dimension of the widthwise direction of the holder 3, the light guide body 4 and the light guide pipe 5. The holder butting block 31 allows the holder 3 to butts against the holder locating block 36 and clamps the holder 3. Before the holder 3 butts against the block 36, a gap between the holder butting block 31 and the holder 3 is about 20 mm so that the operability is taken into consideration. As for the holder butting cylinder, the holder butting block 31 is attached to the forward end of its rod, and the cylinder which deals with a clean room is used in order to prevent generation of dust from the cylinder.

The stage assembly 10 and the holder stage assembly 11 integrally moves the holder 3, the light guide body 4 and the light guide pipe 5, and it is attached to a blade insertion cylinder 33 for inserting forward ends of blades 40a and 40b into the holder 3. The blade insertion cylinder 33 is attached to a workpiece moving cylinder 34 shown in FIG. 9, and it moves the stage assembly 10 and the holder stage assembly 11 to the blade unit 12. An amount of inserting the forward ends of the blades 40a and 40b into the holder 3 according to the embodiment of the present invention is about several hundred micron. The blade insertion cylinder 33 and the workpiece moving cylinder 34 which deal with a clean room are used in order to prevent generation of dust.

Figure 11:
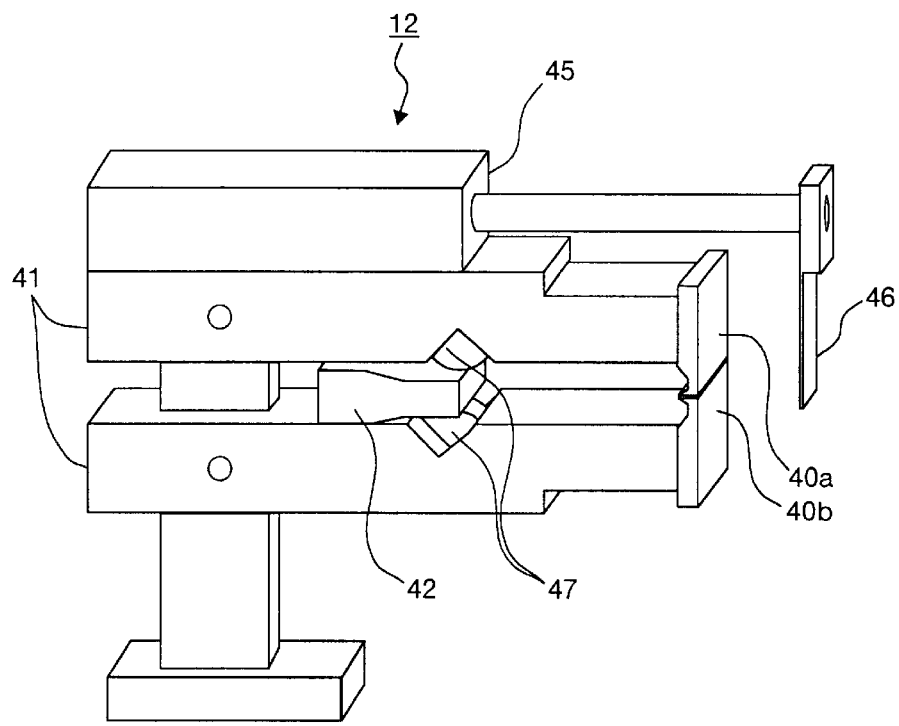
FIG. 11 is one example of an overall view of a blade unit of the thin plate assembly apparatus.
Figure 12:
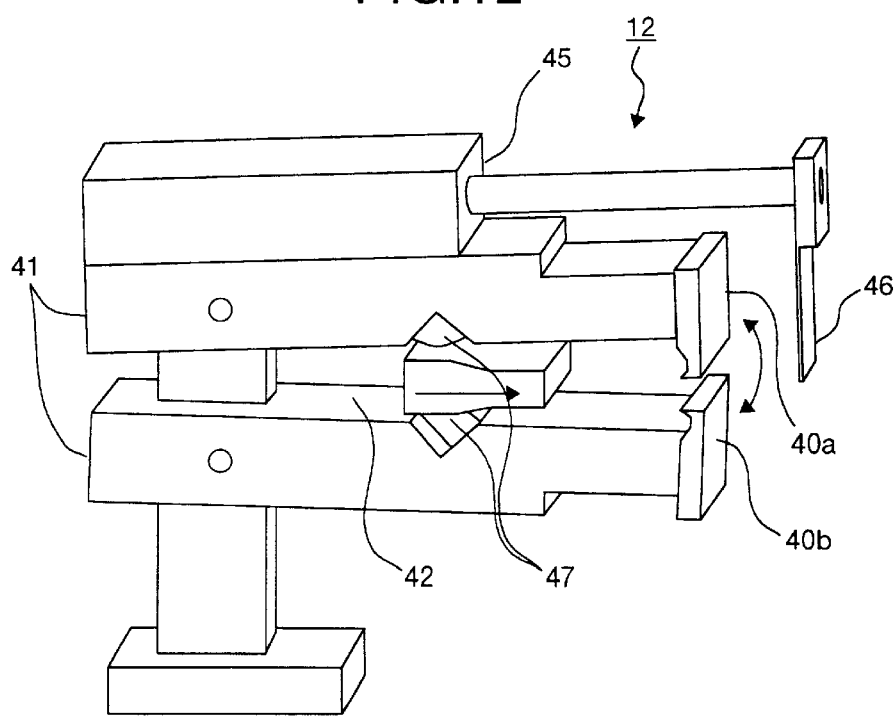
FIG. 12 is another example of an overall view of the blade unit of the thin plate assembly apparatus.

Now, the structure of the blade unit will be explained. FIGS. 11 and 12 are examples of overall views of the blade unit of the thin plate assembly apparatus. The blade unit 12 shown in FIG. 11 is composed of a pair of blades 40a and 40b, an attachment block 41, an expansion cam 42, an expansion cylinder A (not shown), an expansion cylinder B (not shown), an insertion cylinder 45 and an insertion-use plate spring 46. The blades 40a and 40b expand the holder 3. The attachment block 41 fixes the blades 40a and 40b. The expansion cam 42 controls an open/close amount of the blades 40a and 40b. The expansion cylinder A reciprocates the expansion cam 42 so as to expand the blades 40a and 40b by a slight amount. The expansion cylinder B reciprocates the expansion cam 42 so as to greatly expand the blades 40a and 40b. The insertion cylinder 45 and the insertion plate spring 46 are used for inserting the light guide body 4 and the light guide pipe 5 after the expansion of the holder 3.

As for the blades 40a and 40b, portions where the holder 3 is inserted are tapered with 10° and have a sharp blade shape. The width of the blade is about the same as the width of the light guide body 4. Since the upper portions of the blades 40a and 40b might be chipped at the time of expansion, the blades 40a and 40b are subject to the quenching process. In the case where workpieces of different dimensions and materials are used, the blades 40a and 40b are changed. In such a manner, the general-purpose mechanism which does not depend on types is introduced, the cost and a number of steps at the time of the improvement in the apparatus due to a change in types can be suppressed. As a result a quick measure can be taken. As for the attachment block 41, a roller follower 47 which rolls on the expansion cam 42 is attached to a vicinity of its center.

Further, a spring (not shown) exists on a side opposite to the attachment surface of the blades 40a and 40b, and it always pushes the attachment block 41 against the expansion cam 42 in order to obtain a stable expansion amount. As for the expansion cam 42, shapes of its upper and lower surfaces are symmetrical, and the blade portions of the blades 40a and 40b are opened and closed by an amount according to thickness of the upper and lower surfaces of the expansion cam 42. Two LM guides (not shown) are attached to the expansion cam 42 via a plate-shaped member, and it enables precise linear movement so that a stable expansion amount is obtained.

It is desirable that the expansion cam 42 is subject to the quenching process. The expansion cylinder A is attached to the expansion cam 42 in a state that its operating portion meets the expansion cam 42 via a member. The operation of the expansion cylinder A, not shown, reciprocates the expansion cam 42, and the moving amount determines an expansion amount of the holder 3 at the time of insertion. An expansion amount in the embodiment of the present invention is about several dozens micron. The expansion cylinder B, not shown, is set below the expansion cylinder A. The operation of the expansion cylinder B reciprocates the expansion cam 42 so that the points of the blades 40a and 40b are opened and closed greatly. The expansion cylinder A and the expansion cylinder B which deal with a clean room are used in order to prevent generation of dust.

The insertion cylinder 45 is attached to an upper portion of the attachment block 41, and the light guide body 4 and the light guide pipe 5 are inserted by the blades 40a and 40b after the holder 3 is expanded. In order to prevent generation of dust from the cylinder, the cylinder which deals with a clean room is used. The insertion-use plate spring 46 is attached to the rod forward end of the insertion cylinder 45, and when the light guide body 4 and the light guide pipe 5 are inserted, the insertion-use plate spring 46 pushes a surface of the light guide body 4 opposite to the surface which is inserted into the holder 3. The insertion-use plate spring 46 prevents an unnecessary load from being applied at the time of inserting the light guide body 4, thereby preventing a damage to a product. Since a convex gate exists on the surface of the light guide body 4 opposite to the surface which is inserted into the holder 3, a clearance is provided on that portion.

Now, the structure of the probe unit will be explained. As sown in FIG. 9, the probe unit 13 is composed of contact probes 50a and 50b, a fixing block 51, an up/down cylinder 52, and an LM guide 53. The contact probes 50a and 50b come in contact with the terminal on the FPC 2 adhered to the holder 3. The fixing block 51 fixes the contact probes 50a and 50b. The up/down cylinder 52 moves the fixing block 51 up and down. The LM guide 53 brings the contact probes 50a and 50b into contact with the terminal accurately.

The contact probes 50a and 50b have a cylindrical shape, and contain a spring. Their diameter is slightly smaller than the width of the terminal on the FPC 2. The contact probe 50a comes in contact with the terminal on the FPC 2 so that a prescribed electric current flows to the LED. The contact probe 50b is provided in order to suppress lift of FPC 2 in a vertical direction, and its forward end comes to a lower position than the forward end of the contact probe 50a.

Four contact probes 50a and two contact probes 50b are attached to the fixing block 51, and they come in contact with predetermined terminals on the FPC 2 respectively. The fixing block 51 having the contact probes 50a and 50b is attached to the forward end of the rod of the up/down cylinder 52. The up/down movement of the up/down cylinder 52 loads/unloads the contact probes 50a and 50b. The up/down cylinder 52 which deals with a clean room is used in order to prevent generation of dust. The LM guide 53 smoothes forthrightness of the up/down movement of the up/down cylinder 52, and enables the contact probes 50a to come in contact with the terminal on the FPC 2 accurately.

Now, the structure of the destaticization blow assembly will be explained. As shown in FIG. 8, the destaticization blow assembly 14 is composed of a destaticization blow 60, a brace 61 and a regulator 62. The destaticization blow 60 destaticizes a static electricity on the surface of a workpiece. The brace 61 arbitrarily determines an emitting position and an angle of the blow to the workpiece. The regulator 62 determines a blow pressure. The destaticization blow 60 automatically senses a charging amount of the surface of the workpiece, and accordingly generates ions. The blow is used at the time of a check after assembly. The brace 61 determines an emitting angle and a distance of the destaticization blow 60 to the workpiece, and is capable of adjusting them. The regulator 62 is attached to a side surface of the brace 61, and adjusts the blow pressure.

Now, the structure of the operation panel will be explained. As shown in FIG. 8, the operation panel 15 is composed of a start/original point return switch 70, an emergency stop/reset 72, a pressure sensor 73a, a pressure sensor 73b, an abnormality lamp 74, and a check release switch 75. The start/original point return switch 70 starts assembly of a workpiece and returns the apparatus to its original point. The emergency stop/reset 72 carries out emergency stop and emergency stop release. The pressure sensor 73a displays a vacuum pressure of the light guide body 4 and detects an error. The pressure sensor 73b displays a vacuum pressure of the holder 3 and detects an error. The abnormality lamp 74 turns on at the time of generation of an error and emergency stop. The check release switch 75 determines end of light emission check of LED.

Now, the structure of the air equipment housing section will be explained. As shown in FIG. 6, an air equipment housing section 16 is composed of a solenoid valve for the operation of the cylinder (not shown), a solenoid valve for the operation of the destaticization blow (not shown), a vacuum ejector for workpiece vacuum (not shown), and a protective cover 79 for covering the air equipment.

Now, the structure of the control box will be explained. A control box, not shown, has a leakage breaker, not shown, a power source lamp, a thumb rotary switch for selecting an operation mode, a toggle switch for switching between an automatic mode and a manual mode on its front surface. The control box contains a sequence and a power source filter.

Now, the structure of the air stand will be explained. An air stand is composed of a filter regulator and an exhaust filter for aggregate exhaust.

Figure 13:
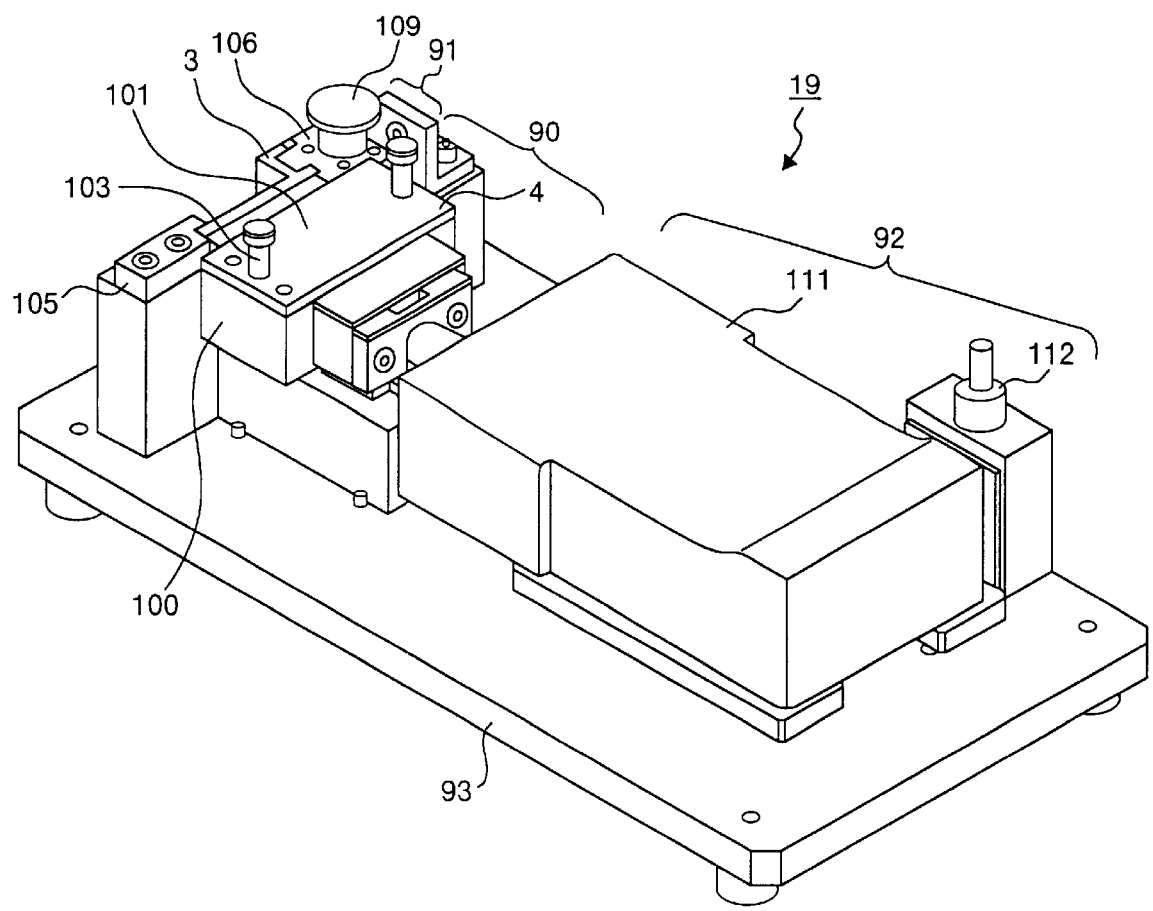
FIG. 13 is an overall view of a fixing force measuring device according to the embodiment of the present invention.

Now, the structure of the fixing force measuring device will be explained. FIG. 13 is an overall view of the fixing force measuring device according to the embodiment of the present invention. In FIG. 13, the fixing force measuring device 19 is composed of a workpiece set assembly 90, a holder clamp assembly 91, and a measuring device set assembly 92. Here, it is desirable that the fixing force measuring device 19 is incorporated in the thin plate assembly apparatus.

The workpiece set assembly 90 is composed of a set block 100 for setting a workpiece, a fixing plate 101 for fixing a workpiece, and an LM guide (not shown) for moving the set block 100. The set block 100 has a form for supporting an area other than the effective light emission area of the light guide body 4 similarly to the stage assembly 10, and uses a black conductive plastic in order to prevent scratch. The fixing plate 101 uses rubber for a contact portion with the light guide body 4. The fixing plate 101 is attached to the set block 100 by using two screws 103, and the screws are tightened so that the rubber cuts into the light guide body 4, and its frictional force fixes the workpiece. At this time, the rubber pushes the edge of the light guide body 4 and does not come into contact with the effective light emission area. The set block 100 can move to only one direction by the LM guide.

The holder clamp assembly 91 is composed of a locating block 105, a butting block 106, and another LM guide (not shown). The locating block 105 locates the end surface of the holder 3. The butting block 106 butts against a surface opposite to the located end surface. The LM guide moves the butting block 106. The locating block 105 butts against one end surface of the holder 3 so as to determine a reference position. The butting block 106 has a spring on the opposite side to the butting surface, and its repulsion force allows the holder 3 to butt and against the locating block so that the holder 3 is fixed. Moreover, after the operability is taken into consideration, a knob 109 is attached to the upper surface of the abutting block 106.

The measuring device set assembly 92 has a cylinder (not shown) for reciprocating the workpiece set assembly and a digital force gauge 111 above the cylinder. An overload portion forward end of the digital force gauge 111 is linked with the workpiece set assembly 90, and the cylinder is operated so that a force which is applied until the light guide body 4 is separated from the holder 3 can be measured.

The workpiece set assembly 90, the holder clamp assembly 91 and the measuring device set assembly 92 are fixed to a base 93, and a mechanical valve 112 for operating the cylinder and a pressure reducing valve (not shown) are also fixed thereto.

Now, the structure of the receiving block will be explained. The receiving block 26 is constituted so that LCD which is used for checking light emission of LED can be set thereon, and the receiving block 26 is inserted into the thin plate set block 20. It is a mechanism which can be slid manually so that LCD can be taken out. Since when a light is reflected at the time of checking LED, an accurate check cannot be made, black conductive plastic is used as a countermeasure against static electricity.

Figure 14:
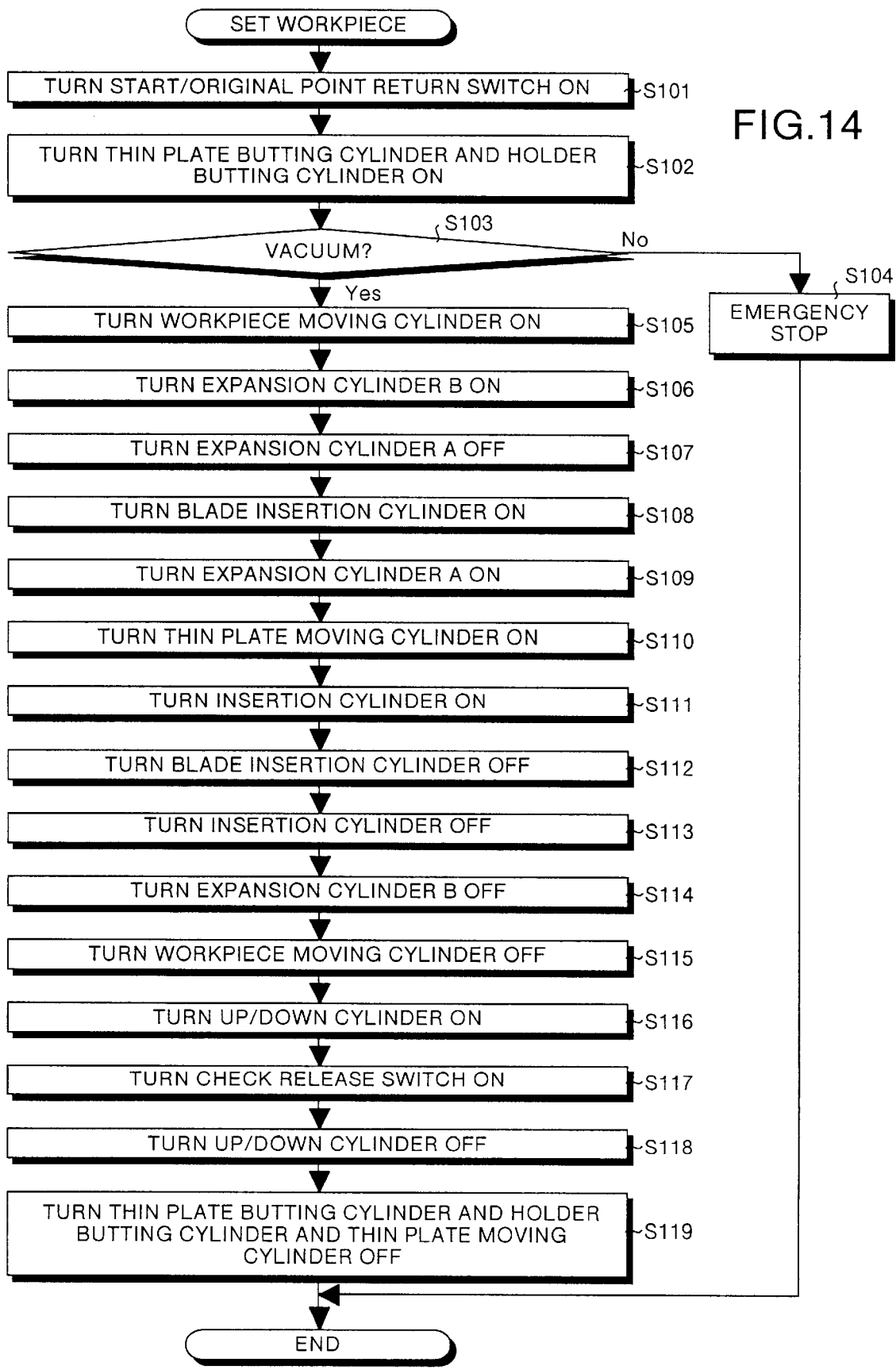
FIG. 14 is a flow chart showing a procedure for assembling the thin plate assembly apparatus.
Figure 15:
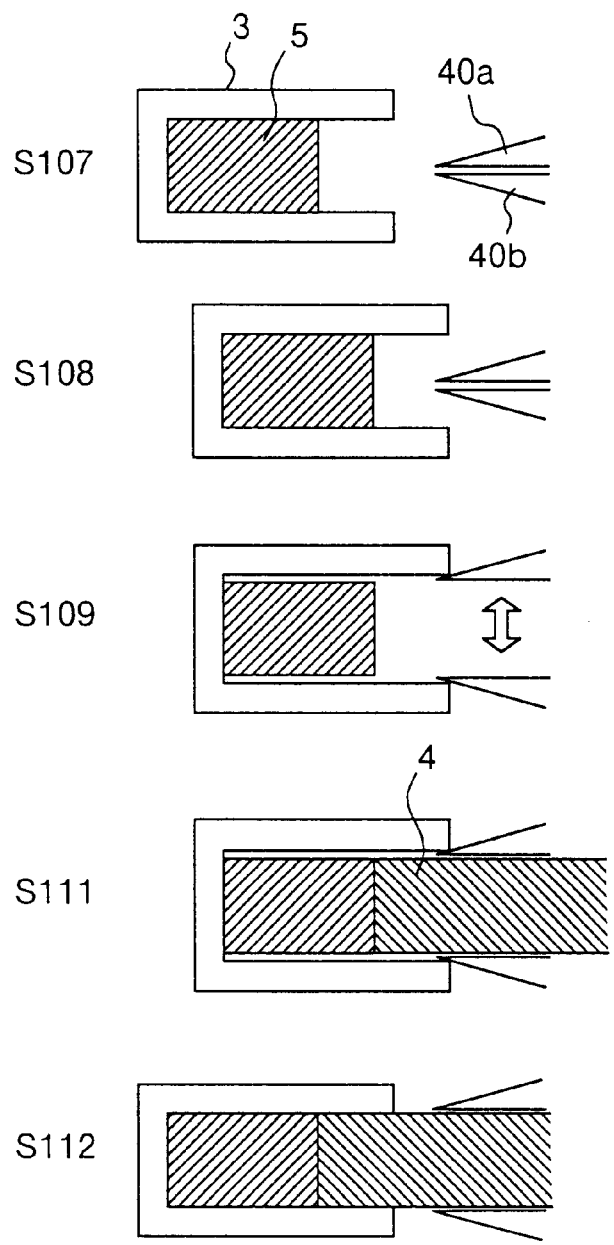
FIG. 15 is an explanatory diagram showing a relationship between the holder and a blade forward end of the thin plate assembly apparatus.
Figure 16:
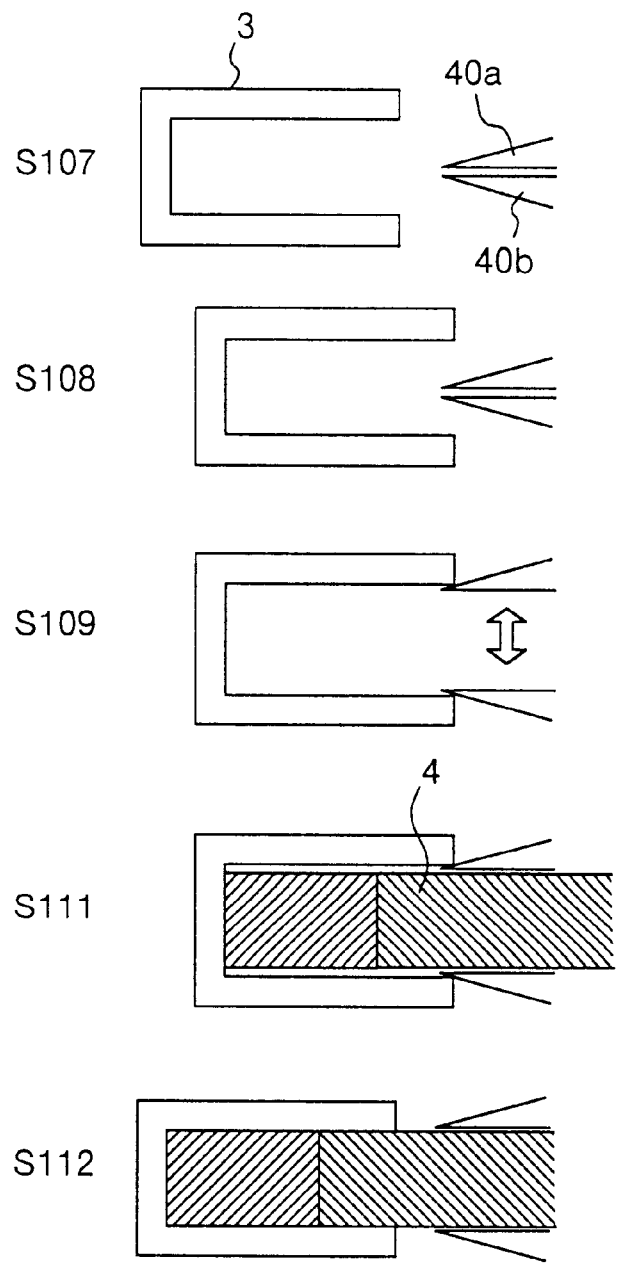
FIG. 16 is another explanatory diagram showing the relationship between the holder and the blade forward end of the thin plate assembly apparatus.

Now, operation of the thin plate assembly apparatus and how the thin plate assembly apparatus is used will be explained. FIG. 14 is a flow chart showing an operating procedure of assembling the thin plate assembly apparatus. Moreover, FIGS. 15 and 16 are explanatory diagrams showing a relationship between the holder 3 and the blades 40a and 40b. In FIG. 15, the light guide pipe 5 has been already inserted into the holder 30 to which FPC 2 is adhered. In FIG. 16, the light guide pipe has not been attached.

In FIG. 14, as preparation, the leakage breaker of the control box is turned on, and the start/original point return switch 70 is pushed (ON) so that the apparatus is returned to its original point (step S101). Next, the light guide body 4 and the holder 3 are set in predetermined positions of the stage assembly 10 and the holder stage assembly 11. The start/original point return switch 70 is pushed so that the automatic assembly is started.

Firstly the switches of the butting cylinders (the thin plate butting cylinder and the holder butting cylinder) of the stage assembly 10 and the holder stage assembly 11 are turned ON (step S102). The respective cylinders (the thin plate butting cylinder and the holder butting cylinder) are operated, and a workpiece is butted against the guide block 21a and the holder locating block 36 so as to be located and fixed.

In order to make a detection as to whether or not the workpiece is in the predetermined position after locating, the vacuum pressure is checked (step S103). In the case where the vacuum pressure does not reach a prescribed value, namely, a vacuum state is not obtained (No at step S103) an error occurs, and the apparatus is emergency-stopped (step S104). When the vacuum pressure is checked and it reaches the prescribed value (Yes at step S103), the workpiece moving cylinder 34 is turned ON so as to be operated (step S105) and the whole workpiece is moved to the blade unit 12. At this time, the expansion cylinder B is turned ON (step S106) so that the blades 40a and 40b are opened greatly.

Next, when the expansion cylinder A is turned OFF (step S107), the blades 40a and 40b are closed so as to be capable of being inserted into the holder 3. In FIGS. 15 and 16, "S107:" shows this state. In order to insert the forward ends of the blades 40a and 40b into the holder 3, the blade insertion cylinder 33 is operated (the blade insertion cylinder 33 is ON, step S108). In FIGS. 15 and 16, "S108:" shows this state. Here, the blade insertion cylinder 33 operates and the blades are fixed, but the operation is not limited to this. Namely, the blades may operate (move), or both the blades and the holder (blade insertion cylinder 33) may operate (move).

After the forward ends of the blades 40a and 40b are inserted, the expansion cylinder A is operated (expansion cylinder A is ON, step S109) so as to open the forward ends of the blades 40a and 40b by a prescribed amount and expand the opening of the holder 3. In FIGS. 15 and 16, "S109:" shows this state. When the thin plate moving cylinder 25 is turned ON after expansion (step S110), the needle-shaped portions of the forward ends of the guide blocks 21a and 21b move into the holder 3 or to its vicinity. Thereafter, the light guide body 4 reaches the holder 3, and the insertion cylinder 45 is operated (the insertion cylinder 40 is ON, step Sill) so as to insert the light guide body 4 into the holder 3 until the light guide body 4 butts against the light guide pipe. In FIGS. 15 and 16, "S111:" shows this state.

After the insertion is completed, the blade insertion cylinder 33 is turned OFF (step S112) so as to evacuate the blades. In FIGS. 15 and 16, "S112:" shows this state. Further, the insertion cylinder 45 is turned OFF (step S113), and the expansion cylinder B is turned OFF (step S114), and the workpiece moving cylinder 34 are turned OFF (step S115) so as to return to its original point.

Next, in order to check LED, the up/down cylinder 52 is turned ON (step S116) so as to descend. The contact probe 50b pushes a lift of the FPC 2, and the contact probe 50a comes into contact with the terminal on the FPC 2, and the LED lights ON. While the LED is ON, the destaticization blow 60 is emitted to the surface of the workpiece. When a visual check is completed, the check release switch 75 is pushed (the check release switch 75 is ON, step S117) so that the emission of the blow is ended. Thereafter, the up/down cylinder 52 (step S118), the thin plate butting cylinder, the holder butting cylinder and the thin plate moving cylinder 25 (step S119) are successively evacuated, and the assembly and the check are ended.

Now, operation of the fixing force measuring device 19 and how the fixing force measuring device 19 is used will now be explained. As preparation, a check is made as to the cylinder, not shown, is in the original point and as to a display of the digital force gauge 111 indicates 0.0 Kgf. Firstly the butting block 106 is manually pulled, and while the end surface of the holder 3 is butting against the locating block 105, a workpiece is set on the set block 100. Thereafter, the butting block 106 is returned so as to fix the workpiece. Next, the up-and-down direction of the workpiece is fixed by the fixing plate 101. The mechanical valve 112 is operated so as to operate the cylinder, and the fixed light guide body 4 is drawn, and a maximum force at that time is read from the digital force gauge 111. Thereafter, the fixing plate 101 is removed, the holder 3 and the light guide body 4 are removed, and the cylinder is returned to its original point.

As explained above, according to the embodiment of the present invention, at the step of manufacturing the front light unit of a portable telephone, the light guide body 4 and the light guide pipe 5 can be inserted into the holder 3 without damaging them so as to be assembled, and a number of handling times is reduced, and the quality of products can be improved. Moreover, the workpiece assembly can be evaluated by the fixing force measuring device, and the quality of products can be stabilized.

The thin plate assembly method described in the embodiment can be realized by executing prepared programs in computers such as personal computers and workstations. The programs can be distributed through networks such as the Internet. The programs are recorded on computer readable recording media such as a hard disk, a floppy disk, a CD-ROM, an MO, and a DVD, and are executed such that the programs are read from the recording media by computers.

As explained above, the present invention provides the method of and apparatus for thin plate assembly and the computer program capable of carrying out assembly of the thin plate assembly product such as a light guide body efficiently and securely without damaging the thin plate.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A thin plate assembly method of inserting a thin plate including a light guide body, into an opening of a U-shaped member, a width thereof is narrower than a thickness of the thin plate, comprising the steps of:

inserting an edged member having separated two forward ends into the opening of the U-shaped member;

widening a gap between the two forward ends of the edged member inserted at the edged member inserting step so as to expand the width of the opening;

inserting the thin plate into the opening, the width thereof is expanded at the expanding step; and drawing the edged member from the opening after the thin plate is inserted into the opening at the thin plate inserting step.

2. The thin plate assembly method according to claim 1, further comprising the step of checking light emission of LED, which has been attached to the U-shaped member, in a state that the edged member is drawn from the opening at the edged member drawing step.

3. The thin plate assembly method according to claim 1, further comprising the step of destaticizing static electricity from the U-shaped member and the thin plate in a state that the edged member is drawn from the opening at the edged member drawing step.

4. The thin plate assembly method according to claim 1, further comprising the step of measuring a fixing force between the U-shaped member and the thin plate in the state that the edged member is drawn from the opening at the edged member drawing step.

5. The thin plate assembly method according to claim 1, wherein at the edged member inserting step, the U-shaped member is moved to a direction where it reaches the edged member so that the edged member is inserted into the opening.

6. The thin plate assembly method according to claim 1, wherein at the expanding step, the opening is expanded so that its width becomes wider than the thickness of the thin plate.

7. The thin plate assembly apparatus for inserting a thin plate including a light guide body, into an opening of a U-shaped member, a width thereof is narrower than a thickness of the thin plate, said thin plate assembly apparatus comprising:

a fixing member for fixing the U-shaped member; and an edged member having separated two forward ends, wherein the fixing member for fixing the U-shaped member and the edged member are moved relatively so that the separated two forward ends are inserted into the opening of the U-shaped member, and a gap between the inserted two forward ends of the edged member is widened so that the width of the opening is expanded, and the thin plate is inserted into the opening with the widened width, and after that the fixing member for fixing the U-shaped member and the edged member are moved relatively so that the edged member is drawn from the opening.

8. The thin plate assembly apparatus according to claim 7, further comprising a checking device for checking light emission of LED attached to the U-shaped member in a state that the edged member is drawn from the opening.

9. The thin plate assembly apparatus according to claim 7, further comprising a destaticizing device for destaticizing static electricity charged on the U-shaped member and the thin plate in the state that the edged member is drawn from the opening.

10. The thin plate assembly apparatus according to claim 7, further comprising a fixing force measuring device for measuring a fixing force between the U-shaped member and the thin plate in the state that the edged member is drawn from the opening.

11. The thin plate assembly apparatus according to claim 7, wherein the edged member widens a gap between the separated two forward ends so that the width of the opening becomes wider than the thickness of the thin plate.

12. A computer program containing instructions which when executed on a computer causes the computer to insert a thin plate including a light guide body, into an opening of a U-shaped member, a width thereof is narrower than a thickness of the thin plate, the computer program realizing the steps of:

inserting an edged member having separated two forward ends into the opening of the U-shaped member;

widening a gap between the two forward ends of the edged member inserted at the edged member inserting step so as to expand the width of the opening;

inserting the thin plate into the opening, the width thereof is expanded at the expanding step; and drawing the edged member from the opening after the thin plate is inserted into the opening at the thin plate inserting step.

13. The computer program according to claim 12, further realizing on the computer the step of checking light emission of LED which has been attached to the U-shaped member is executed by a computer in a state that the edged member is drawn from the opening at the edged member drawing step.

14. The computer program according to claim 12, further realizing on the computer the step of destaticizing static electricity from the U-shaped member and the thin plate is executed by the computer in the state that the edged member is drawn from the opening at the edged member drawing step.

15. The computer program according to claim 12, further realizing on the computer the step of measuring a fixing force between the U-shaped member and the thin plate is executed by a computer in the state that the edged member is drawn from the opening at the edged member drawing step.

16. The computer program according to claim 12, wherein at the edged member inserting step, the U-shaped member is moved to a direction where it reaches the edged member so that the edged member is inserted into the opening.

17. The computer program according to claim 12, wherein at the expanding step, the opening is expanded so that its width becomes wider than the thickness of the thin plate.

* * * * *